United States Patent Office.

JOHN J. CROOKE, OF SOUTHFIELD, AND LEWIS CROOKE, OF NEW YORK, N. Y.

Letters Patent No. 113,501, dated April 11, 1871.

IMPROVEMENT IN PLATED BUTT-HINGES.

The Schedule referred to in these Letters Patent and making part of the same.

We, JOHN J. CROOKE, of Southfield, in the county of Richmond and State of New York, and LEWIS CROOKE, of the city, county, and State of New York, have invented a certain Improvement in Manufacturing Plated Butt-Hinges, of which the following is a specification.

Nature and Object of the Invention.

This invention has for its object the production of a wrought-iron plated hinge at a trifling cost, and consists in the process hereinafter described, and made up of the several operations hereinafter set forth.

Till within a very recent period the production of wrought-iron plated hinges has been attended with so great expense as to make their price so high as to prevent their being extensively sold in the market, as the iron had to be first prepared by dressing with a file or equivalent means, and then polished before it presented a suitable surface for plating with more precious metal.

In the Letters Patent of the United States granted to us dated December 28, 1869, we have described a process by which the difficulties theretofore experienced in making plated butt-hinges from wrought-iron are very much obviated, and a good plated wrought-iron hinge produced at a very much reduced cost.

In that process the iron plate was first freed from scale by being subjected to the pickling process; then coated with tin to fill up the depressions in the iron; then rolled between highly-finished rollers to produce a suitable surface for plating; then cut up and made into hinges; and afterward plated by means of the battery process.

But while that process answers an excellent purpose, it was, nevertheless, open to two objections—first, that tin, being a somewhat expensive metal, the quantity used for coating the iron plates form, in the aggregate, a very considerable item in the cost of manufacturing these hinges; and, second, that the metal, being necessarily worked into hinges after the tin was rolled down to a surface and before the plating was applied, the tin surface was liable, to a certain extent, to receive scratches and indentations from contact with other hinges in the process of handling before being plated.

These objections we propose to obviate by the present invention.

General Description.

In manufacturing plated hinges according to our present invention we take wrought-iron plates, suitable for hinges, as they come from the rolling-mill, and anneal them so as to make the iron soft, so that, when otherwise ready for the operation, it may be easily rolled down to an even surface.

After it is annealed we then subject it to the well-known pickling process, and carefully remove all the scale therefrom; and when this has been done we pass it between highly-polished rollers a sufficient number of times to reduce it to a smooth, even surface.

Generally it will be best to pass it two or three times through the rollers for that purpose.

This operation, however, so compresses the fiber of the iron that it is impracticable to work it in that state into hinges; and to anneal it again in the ordinary way would ruin the finished surface which had been produced for plating purposes.

We next anneal these plates out of contact with the atmosphere, by which the surface is preserved nearly intact.

We have found by experiment that a very satisfactory way is to inclose the plates or sheets of metal so far prepared in a close box and packed in air-slaked lime, and then, while so protected from the atmosphere, subjecting them to sufficient heat to anneal the metal so that it may be worked into hinges.

After the plates have been thus annealed, and when taken out of the lime, there will be found small particles adhering to the surface, which can be removed by subjecting them for a moment to the action of the pickling-bath, care being taken to remove them quickly and cleanse them from the acid and oil them before the surface is injured for plating purposes; or these particles may be removed, by means of a brush-wheel, with oil and tripoli or other suitable cutting material; but we prefer the mode we have described of removing them by means of the pickling-bath, as being less expensive.

These plates thus prepared are then ready to be worked into hinges in the manner now practiced, after which we plate them with nickel or other suitable fine metal in the usual manner, by the battery.

It is proper to remark here that the first annealing process previous to removing the scale might, perhaps, be dispensed with; but it would subject the rollers to more severe pressure, and make it more difficult to secure a proper surface, and we prefer to anneal the iron before pickling it as well as after it is pickled and rolled.

After the iron has been pickled for the removal of the scale it is well to pass it between a pair of coarse rolls, or a pair other than the finishing-rolls, and wash it in water, to remove any particles of the scale which may still adhere, especially if the pickling is at all imperfect, before putting it through the finishing-rolls, as the scale is very destructive to the necessarily-fine finishing which is required upon the finishing-rolls to give that perfect surface which is necessary for plating.

This process furnishes a very good plated wrought-iron hinge at a trifling cost, and obviates the difficulty found in the easy abrasion of the tinned surface mentioned in our patent above referred to, and saves the necessary cost of the tin used in producing that surface. The plating itself, when the hinge is finished, is also less liable to injury, it being upon a solid iron surface, which supports it better against abrasion from a blow or pressure than the tin surface above mentioned, though the hinge plated upon tin answers a very good purpose.

*Claim.*

We claim as our invention—

The art or process hereinbefore described of manufacturing plated hinges by pickling the iron plates, whether first annealed or not; afterward reducing them to a smooth and even surface by rolling; afterward annealing them out of contact with the atmosphere; afterward making them up into hinges; and afterward plating them by the battery process, substantially as hereinbefore set forth.

JOHN J. CROOKE.
LEWIS CROOKE.

Witnesses:

L. W. How,
Thos. P. How.